United States Patent
Ueda

(10) Patent No.: US 8,593,547 B2
(45) Date of Patent: Nov. 26, 2013

(54) IMAGE PROCESSING APPARATUS, IMAGE CAPTURING APPARATUS, AND IMAGE PROCESSING METHOD

(75) Inventor: Toshiharu Ueda, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/275,681

(22) Filed: Oct. 18, 2011

(65) Prior Publication Data

US 2012/0113301 A1     May 10, 2012

(30) Foreign Application Priority Data

Nov. 9, 2010   (JP) .................................. 2010-251277

(51) Int. Cl.
*H04N 9/64* (2006.01)
(52) U.S. Cl.
USPC ............................................ 348/246; 348/247
(58) Field of Classification Search
USPC ................................ 348/246, 247, 241, 222.1
See application file for complete search history.

(56) References Cited

U.S. PATENT DOCUMENTS

| 7,940,322 | B2 * | 5/2011 | Kikuchi et al. | 348/345 |
| 2006/0132626 | A1 * | 6/2006 | Sakurai | 348/246 |
| 2007/0237429 | A1 * | 10/2007 | Kusaka | 382/312 |
| 2010/0073527 | A1 * | 3/2010 | Ichimiya | 348/247 |
| 2010/0245631 | A1 * | 9/2010 | Hoda et al. | 348/241 |
| 2011/0273602 | A1 * | 11/2011 | Takamiya et al. | 348/302 |

FOREIGN PATENT DOCUMENTS

| JP | 2001177756 A | * | 6/2001 |
| JP | 2003-244712 | | 8/2003 |
| JP | 2007124056 A | * | 5/2007 |
| JP | 2007-325139 | | 12/2007 |
| JP | 4146186 | | 9/2008 |

* cited by examiner

*Primary Examiner* — Tuan Ho
*Assistant Examiner* — Zhenzhen Wu
(74) *Attorney, Agent, or Firm* — Cowan, Liebowitz & Latman, P.C.

(57) ABSTRACT

An image processing apparatus for processing image signals output from an image sensor having a plurality of unit cells each including a plurality of photoelectric conversion elements for receiving light passing through different pupil regions and each of which can be read out separately, wherein: a detection unit detects a phase difference between a plurality of images each formed on the basis of image signals of photoelectric conversion elements located in a same position in each of the plurality of unit cells; a determination unit determines a defective photoelectric conversion element; and a correction unit corrects a defective image signal of a defective photoelectric conversion element using an image signal corresponding to the defective image signal and constituting another of the plurality of images that does not include the defective image signal, based on the phase difference detected by the detection unit.

10 Claims, 9 Drawing Sheets

IMAGE OUTPUT=1a+1b+1c+1d

B IMAGE=1c+1d
A IMAGE=1a+1b

IMAGE PROCESSING APPARATUS, IMAGE CAPTURING APPARATUS, AND IMAGE PROCESSING METHOD

BACKGROUND OF THE INVENTION

1. Field of the Invention

The present invention relates to an image processing apparatus, an image capturing apparatus and an image processing method, and more particularly to an image processing apparatus, an image capturing apparatus and an image processing method for processing image signals output from an image sensor that is provided with abilities to generate image signals both for a focusing function and for an image capturing function.

2. Description of the Related Art

In recent years, smaller image capturing apparatuses such as digital cameras with higher definition have been sought. One technology for realizing further miniaturization and higher definition that has been attracting attention is an image capturing apparatus provided with pixels for image capturing and pixels for information acquisition (for example, pixels for focusing) within the image sensor, in order to obtain an accurately focused image. This image capturing apparatus is able to obtain a high-definition image by performing focusing image data acquired from the pixels for focusing, as well as acquiring image data for an image from the same screen (see Japanese Patent Laid-Open No. 2003-244712).

However, since the pixels for information acquisition proposed in Japanese Patent Laid-Open No. 2003-244712 have a different structure from the pixels for image capturing, normally correction is performed during image creation in a similar manner to defective pixels, resulting in a degradation in image quality.

In contrast, an image capturing apparatus in which pixels for information acquisition can also be used as pixels for image capturing has been proposed (see Japanese Patent Laid-Open No. 2007-325139). According to this technology, the pixels for information acquisition are divided horizontally and vertically into four, and an image signal is obtained by adding all the signals of the four resultant regions when image capturing. Also, when focusing, pupil division can be performed on the pixels by adding the signals of the two horizontal or vertical regions out of the four regions, and the resultant signals can be used as signals for focusing with a phase difference method (see Japanese Patent Laid-Open No. 2007-325139).

On the other hand, in the case where light-receiving elements are divided into an integer ratio of photosensitive regions, and a portion of the resultant photosensitive regions are defective, Japanese Patent No. 4146186 discloses performing correction based on image data obtained from normal photosensitive regions and the area ratio of abnormal photosensitive regions to normal photosensitive regions.

However, in the case where correction is performed according to the area ratio of abnormal photosensitive regions to normal photosensitive regions, as in Japanese Patent No. 4146186, it may be the case that suitable image data cannot be obtained if those pixels are out of focus.

SUMMARY OF THE INVENTION

The present invention has been made in consideration of the above situation, and, in the case where unit cells are composed of composite pixels and any of the pixels in a unit cell is/are defective pixels, enables appropriate correction to be performed on an image signal output from the defective pixels, even if the defective pixels are out of focus.

According to the present invention, provided is an image processing apparatus for processing image signals output from an image sensor having a plurality of unit cells that each includes a plurality of photoelectric conversion elements for receiving light passing through different pupil regions and in which each of the plurality of photoelectric conversion elements can be read out separately, comprising: a detection unit that detects a phase difference between a plurality of images each formed on the basis of image signals of photoelectric conversion elements located in a same position in each of the plurality of unit cells; a determination unit that determines whether any of the plurality of photoelectric conversion elements is defective; and a correction unit that corrects a defective image signal of a photoelectric conversion element that is determined to be defective by the determination unit, using an image signal corresponding to the defective image signal and constituting another of the plurality of images that does not include the defective image signal, based on the phase difference detected by the detection unit.

Further, according to the present invention, provided is an image capturing apparatus comprising: the image sensor; and the image processing apparatus as described above.

Furthermore, according to the present invention, provided is an image processing method for processing image signals output from an image sensor having a plurality of unit cells that each includes a plurality of photoelectric conversion elements for receiving light passing through different pupil regions and in which each of the plurality of photoelectric conversion elements can be read out separately, comprising: a detection step of detecting a phase difference between a plurality of images each formed on the basis of image signals of photoelectric conversion elements located in a same position in each of the plurality of unit cells; a determination step of determining whether any of the plurality of photoelectric conversion elements is defective; and a correction step of correcting a defective image signal of a photoelectric conversion element that is determined to be defective in the determination step, using an image signal corresponding to the defective image signal and constituting another of the plurality of images that does not include the defective image signal, based on the phase difference detected in the detection step.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate embodiments of the invention and, together with the description, serve to explain the principles of the invention.

DESCRIPTION OF THE EMBODIMENTS

Exemplary embodiments of the present invention will be described in detail in accordance with the accompanying drawings.

Configuration of Image Capturing Apparatus

Figure 1:
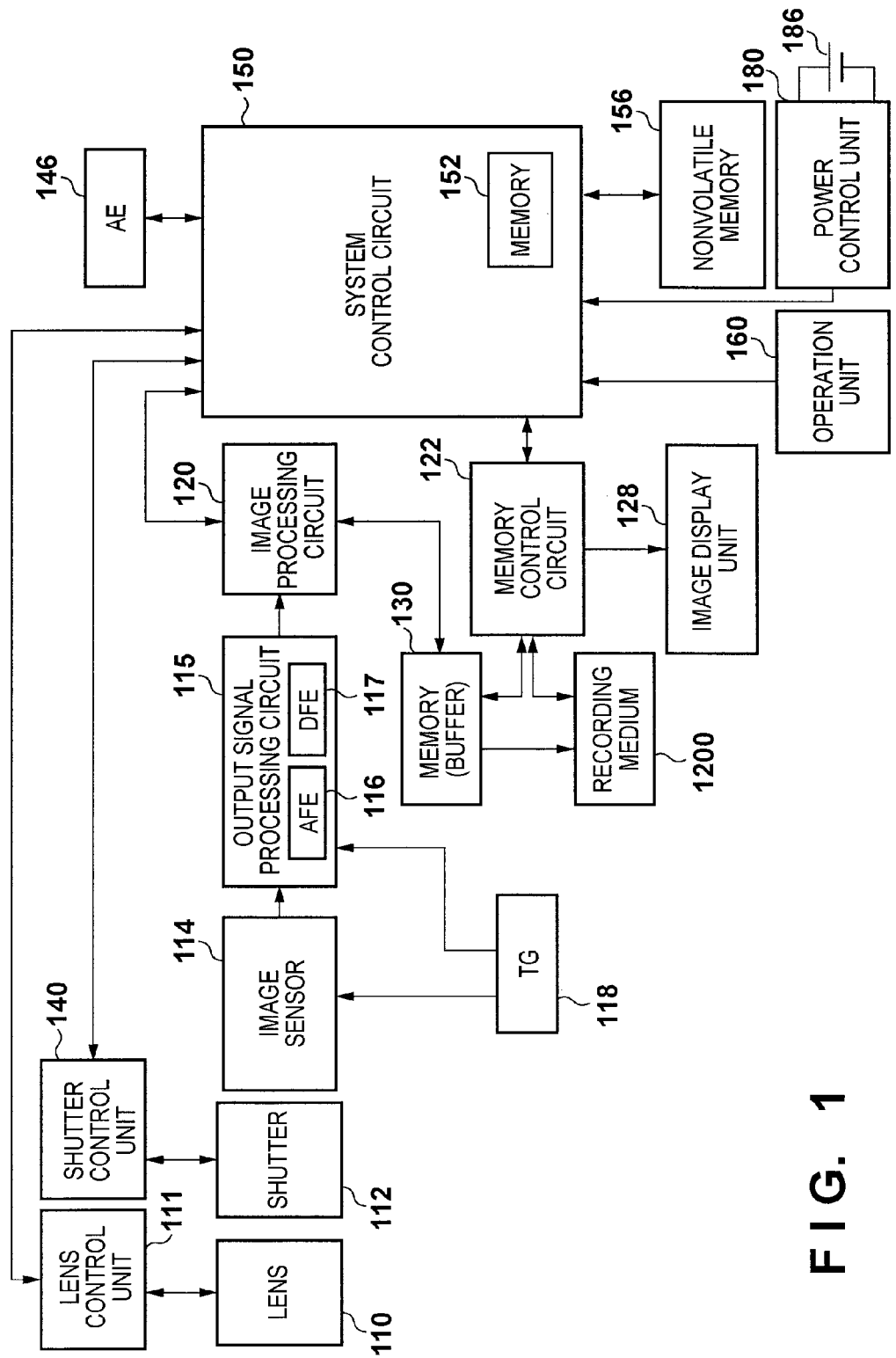
FIG. 1 is a block diagram showing a schematic configuration of an image capturing apparatus according to an embodiment of the present invention.

FIG. 1 is a block diagram showing a schematic configuration of an electronic camera, as an example of an image capturing apparatus according to an embodiment of the present invention.

In FIG. 1, reference numeral 110 denotes a lens that forms an optical image on an image sensor 114, and reference numeral 111 denotes a lens control unit that controls the lens 110. Reference numeral 112 denotes a shutter that controls the exposure amount of the image sensor 114, which will be described below, and reference numeral 140 denotes a shutter control unit that controls the shutter 112. Reference numeral 114 denotes an image sensor such as a CMOS sensor that converts the optical image into an electrical signal. Note that the image sensor 114 is constituted by pixels (unit cells) in which pixels for information acquisition can also be used as pixels for image Capturing. The configuration of the unit cells will be described later with reference to FIGS. 2A to 2C.

Reference numeral 115 denotes an output signal processing circuit that processes analog signals output from the image sensor 114. The output signal processing circuit 115 includes an analog front end (AFE) 116 that performs processing such as OB clamping for adjusting the optical black level to a reference level, as well as analog-to-digital conversion. The output signal processing circuit 115 also includes a digital front end (DFE) 117 that receives the digital output of each pixel and performs digital processing such as sorting and various correction processing.

Reference numeral 118 denotes a timing generation circuit that supplies a clock signal and a control signal to the image sensor 114 and the output signal processing circuit 115. Reference numeral 120 denotes an image processing circuit that performs predetermined image processing such as a defective pixel correction and color conversion on data from the signal processing circuit 115.

Reference numeral 122 denotes a memory control circuit that controls reading out of image signals and correction information from a memory 130, a memory 152 and a recording medium 1200, as well as information displayed on an image display unit 128. The image display unit consists of a TFT LCD. The memory 130 is used for storing captured still images and moving images, and has sufficient storage capacity to store still images of a prescribed number or moving images of a prescribed length. Also, the memory 130 is provided with a holding area for use in correction in which image signals are held when the image processing circuit 120 performs correction and other controls, and an image storage buffer area for when performing a save operation to the recording medium 1200. Reference numeral 146 denotes a photometry control unit for performing auto exposure (AE) processing.

Reference numeral 150 denotes a system control circuit that controls the entire image processing apparatus, and incorporates a known CPU and the like. The system control circuit 150 is also provided with a memory 152 for storing constants, variables and programs for use in operations thereof.

The memory 152 is also provided internally with the function of reading out, from a nonvolatile memory 156 that will be described later, required information during operation by the image capturing apparatus of the present embodiment, and holding the read information.

Reference numeral 156 denotes a nonvolatile memory such as an EEPROM that can be electrically erased and recorded and in which programs described below are stored, with correction/adjustment information specific to the image capturing apparatus such as defective pixel information also being stored in the nonvolatile memory 156.

Reference numeral 160 denotes an operation unit to input various operation instructions for the system control circuit 150. The operation unit 160 includes a shutter switch that is turned on in stages by being pressed, and consists of SW1 that performs a shooting preparation operation (AF, AE, etc.) and SW2 that performs operations from shooting (shutter control, charge accumulation operation, readout operation) to image processing and recording. A live view switch that operates a live view function and a main switch for supplying power to the various systems are further included.

Reference numeral 180 denotes a power control unit constituted by a battery detection circuit, a DC-DC converter and the like, and reference numeral 186 denotes a power unit consisting of an alkaline battery, a lithium battery, or the like. Reference numeral 1200 denotes a removable recording medium such as a memory card or a hard disk.

Configuration of Image Sensor

Figure 2A:
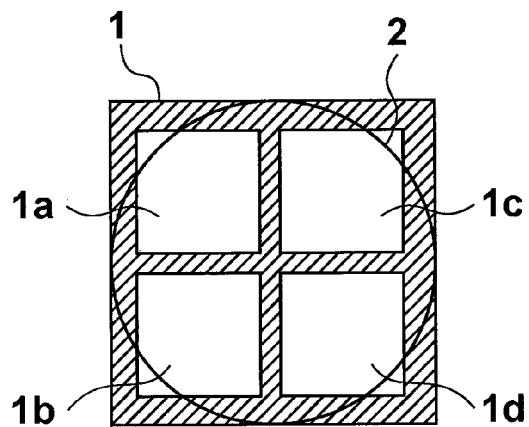
FIGS. 2A-2C are top views showing the concept of unit cells having a composite pixel structure that constitute an image sensor according to the embodiment.
Figure 2B:
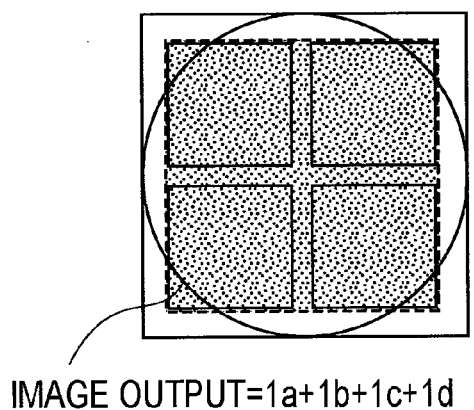
Figure 2C:
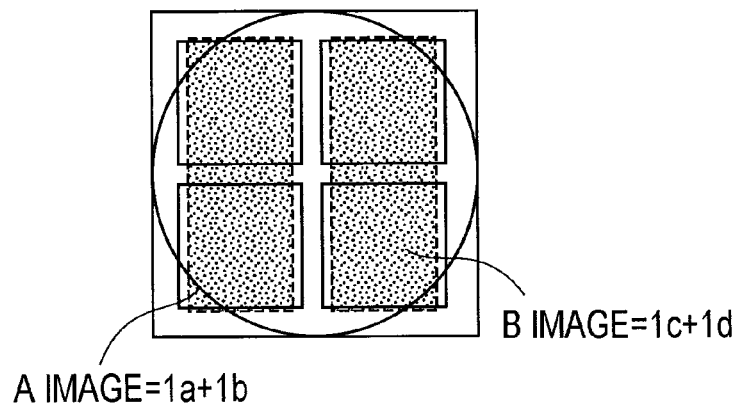

FIGS. 2A to 2C are top views showing the concept of pupil-divided pixels, or unit cells constituted by so-called composite pixels, that constitute the image sensor 114 shown in FIG. 1 and are used for both information acquisition and image capturing. In FIG. 2A, reference numeral 1 denotes a unit cell of the image sensor 114, with the image sensor 114 having a plurality of unit cells 1. Reference numeral 1a to 1d denote pixels that are each provided with a known image capturing pixel structure including a photoelectric conversion element, and are each able to be output separately. Also, on top of the pixels 1a to 1d constituting each unit cell 1 is set a known color filter of the same color. Reference numeral 2 denotes a known micro lens that is provided for each unit cell 1. Since the micro lens 2 is provided one per unit cell, the pixels 1a to 1d will receive light that has passed through different pupil regions of the micro lens 2.

In the image sensor 114 having such a configuration, by synthesizing all the pixel outputs from the four pixels 1a to 1d in each unit cell, as shown in FIG. 2B, when image capturing, the resultant signals can be used as signals constituting an image. Note that there are various methods of synthesizing the pixel outputs, and pixel outputs may be synthesized at any timing, such as partially adding pixel outputs in the pixels or in the image sensor (adding pixel outputs vertically or horizontally), or adding pixel outputs by performing an operation after output from the image sensor.

On the other hand, when performing information acquisition (focusing operation), the unit cells 1 are divided into two by adding the pixel outputs vertically as shown in FIG. 2C, for example. This enables known focusing control with the phase difference method to be performed, utilizing the horizontal displacement between an A image obtained from the plurality of pixel outputs (1a+1b) on the left side of the unit cells 1 and a B image obtained from the plurality of pixel outputs (1c+1d) on the right side (phase difference between pixels) of the unit cells 1. Similarly, by adding the pixel outputs so as to divide the unit cells horizontally, focusing control with the phase difference method can be performed utilizing the vertical displacement.

Here, a problem that arises when correction is performed using the method of the above-mentioned Japanese Patent No. 4146186 in the case where one of the pixels of the unit cell 1 is a defective pixel will be described.

Figure 3A:
FIGS. 3A-3C are diagrams illustrating a problem in the case of correcting a defective image based on the area ratio of defective pixels to normal pixels.
Figure 3B:
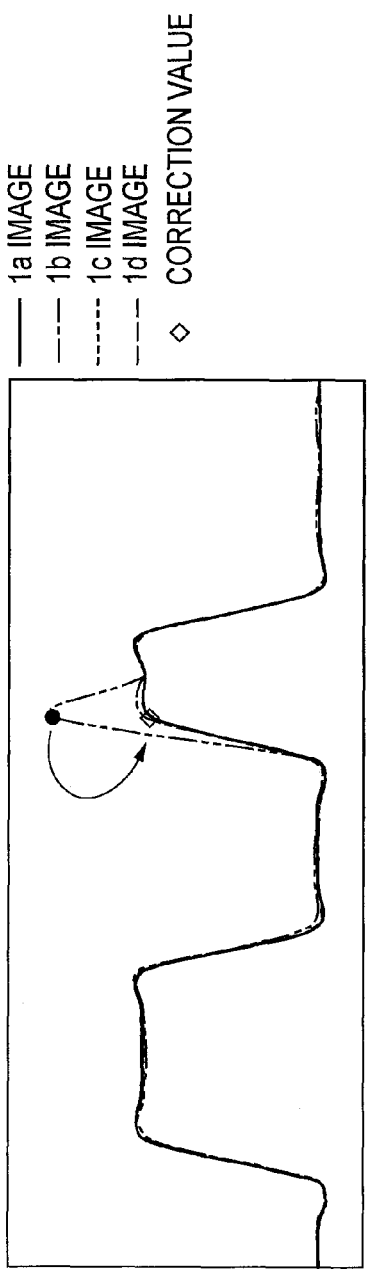
Figure 3C:
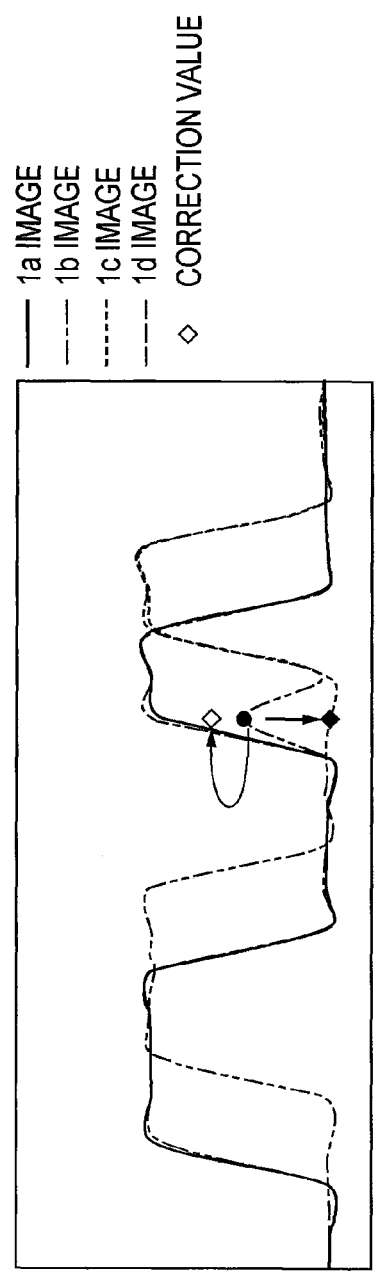

FIGS. 3A to 3C show examples in which a correction target for when correcting image data is set based on the area ratio of defective pixels to normal pixels. FIG. 3A is a diagram showing a portion of the horizontal arrangement of the unit cells 1, with the bottom right pixel 1d of the 11th unit cell 1 from the left being shown here as an example of a defective pixel. In order to simplify the description, an example is shown in which only horizontal phase difference occurs, but a similar problem also arises in the case where vertical phase difference occurs.

FIG. 3B shows an example of the respective output values of the pixels 1a to 1d in the case where an object whose image is formed in the vicinity of the defective pixel is in focus, and FIG. 3C shows an example of the respective output values of the pixels 1a to 1d in the case where an object whose image is formed in the vicinity of the defective pixel is out of focus. Note that in FIGS. 3B and 3C, an image obtained from output values of the pixels 1a will be called a 1a image, an image obtained from output values of the pixels 1b will be called a 1b image, an image obtained from output values of the pixels 1c will be called a 1c image, and an image obtained from output values of the pixels 1d will be called a 1d image.

In FIG. 3B, since the object is in focus, 1a image≈1b image≈1c image≈1d image, and only the output value of the defective pixel 1d is displaced ("•" on the graph). In the correction method of Japanese Patent No. 4146186, the output values of the normal pixels 1a, 1b and 1c in the unit cell that contains the defective pixel 1d are multiplied by the ratio of the area of the defective pixel 1d to the area of the normal pixels 1a, 1b and 1c. In the case where the object is in focus, the correction value will be as represented by "◇" on the graph, and the correct output value of the defective pixel 1d can be almost exactly predicted.

On the other hand, in FIG. 3C, since the object is out of focus, 1a image≈1b image≠1c image≈1d image. That is, displacement due to phase difference arises not only in the output value of the defective pixel id ("•" on the graph) but also between the 1a and 1b images and the 1c and 1d images output from the normal pixels. In this case, the value obtained by multiplying the output values of the normal pixels 1a, 1b and 1c in the unit cell containing the defective pixel 1d by the ratio of the area of the defective pixel 1d to the area of the normal pixels 1a, 1b and 1c will be a value indicated by "◇" on the graph. However, in this case, a value indicated by "◆", which is substantially equal to the output value of the normal pixel 1c, is considered to be an appropriate correction value for the output value of the defective pixel 1d. Thus, calculating "◇" on the graph as the correction value will result in correction being performed with an incorrect value. In other words, in the case where the object is out of focus, it will be difficult to perform accurate defect correction with the method of Japanese Patent No. 4146186.

Hereinafter, a correction method of the present invention that is able to perform appropriate correction even in the case where the object is out of focus will be described.

Image Shooting Operation

Figure 4:
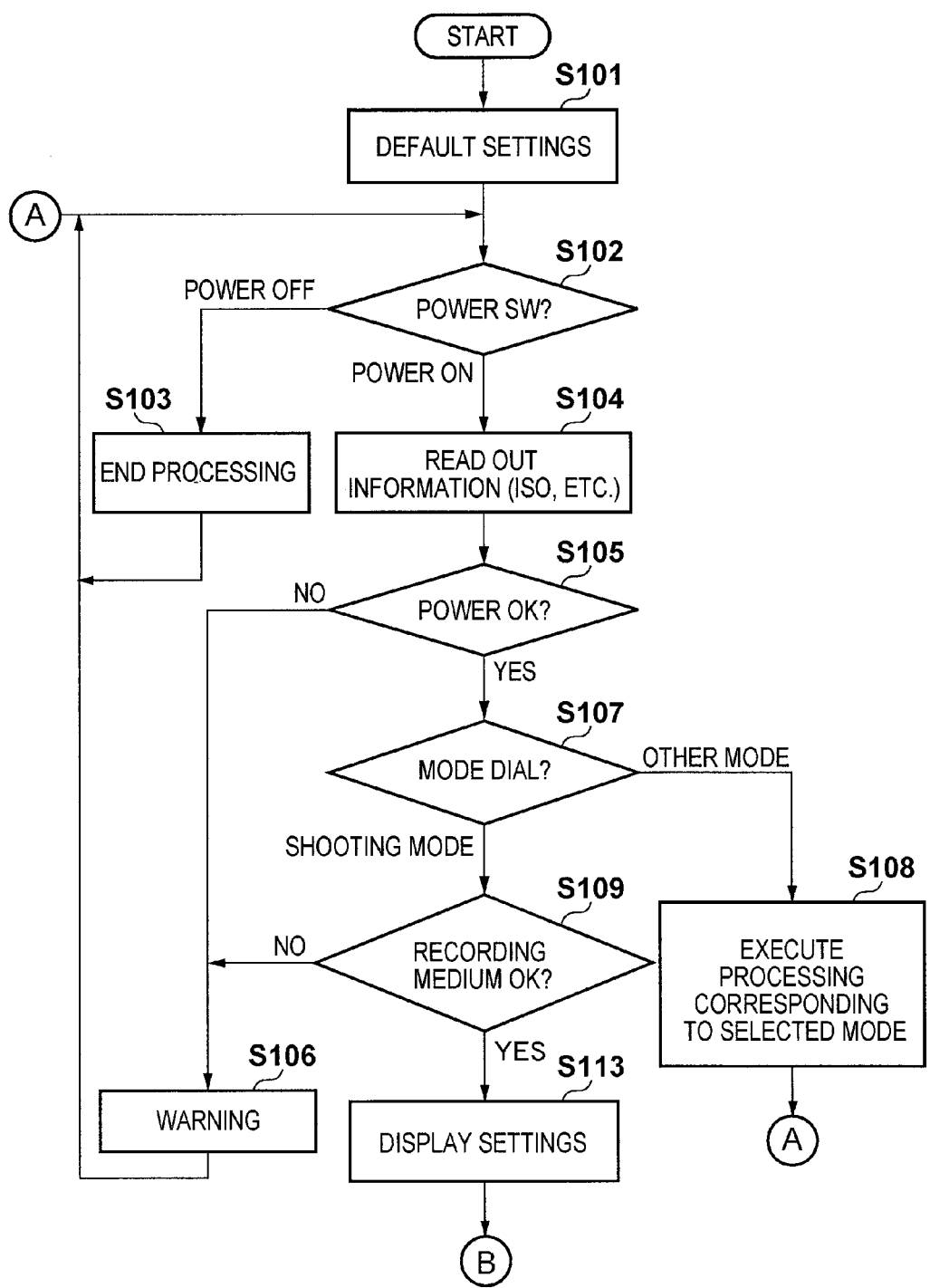
FIG. 4 is a flowchart showing an image shooting operation of the image capturing apparatus according to the embodiment.
Figure 5:
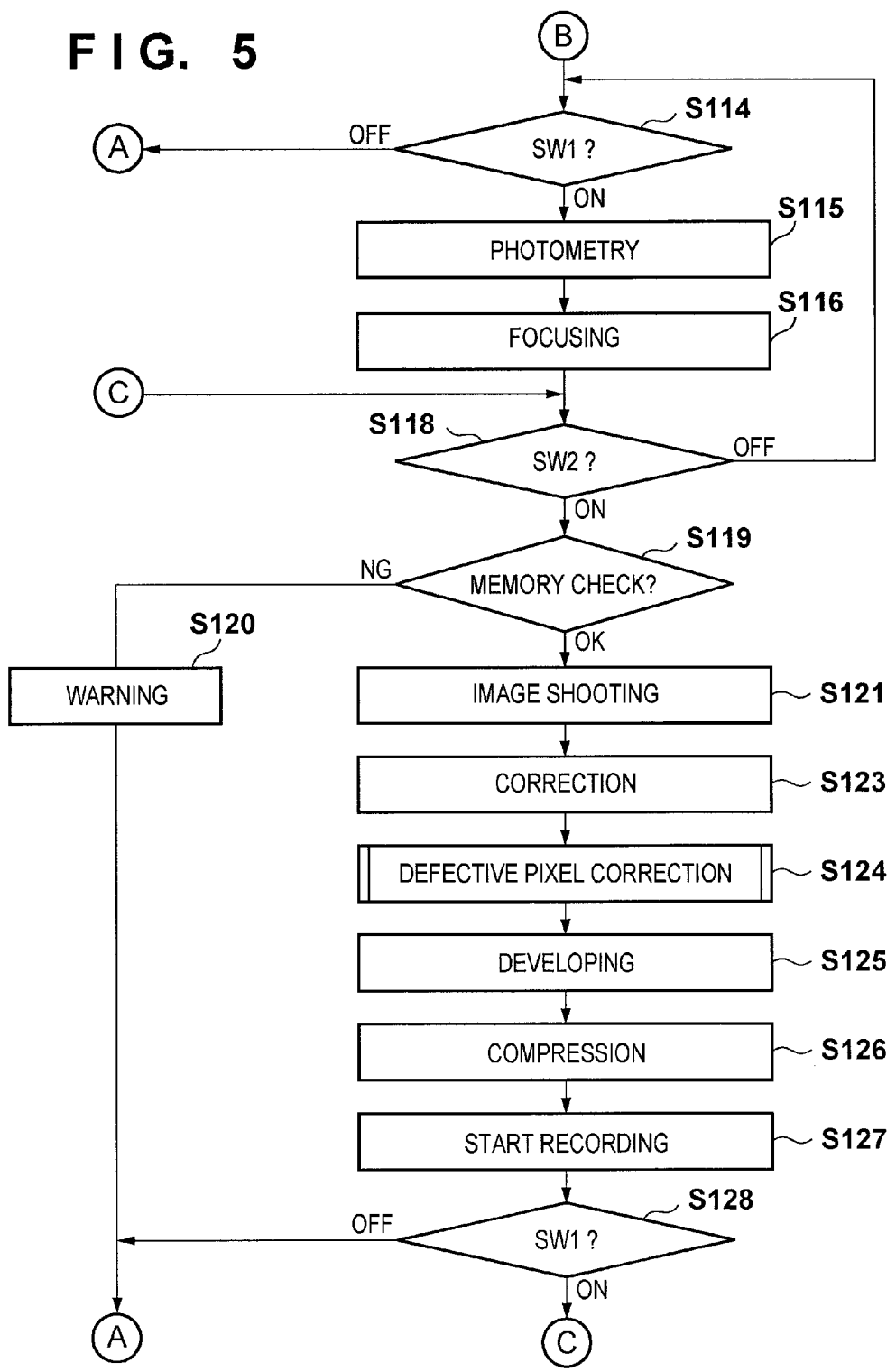
FIG. 5 is a flowchart showing the image shooting operation of the image capturing apparatus according to the embodiment.

FIGS. 4 and 5 are flowcharts showing the processing procedure of an image shooting operation of the image capturing apparatus shown in FIG. 1.

In step S101, as a result of being powered on by a battery replacement or the like, the system control circuit 150 initializes flags, control variables and the like, and configures prescribed default settings required for each unit. At this time, required information recorded on the nonvolatile memory 156 is read out to the memory 152 in the system control circuit 150.

In step S102, the system control circuit 150 determines the set position of the main switch, and determines whether power is set to OFF. If power is set to OFF, prescribed end processing is performed in step S103, after which the procedure returns to step S102. Here, for example, display on the image display unit 128 is changed to an end state, required parameters, settings and setting modes including flags and control variables are recorded in the nonvolatile memory 156, and processing such as cutting off unnecessary power to units including the image display unit 128 by the power control unit 180 is performed.

On the other hand, if power is set to ON, configuration information such as ISO sensitivity that has already been set is read out in step S104. Next, at step S105, the system control circuit 150 determines whether there is a problem with the remaining charge or operating condition of the power unit 186, which is a battery or the like, using the power control unit 180. If it is determined that a problem exists, the procedure transitions to step S106, and if it is determined that no problem exists, the procedure transitions to step S107. In step S106, a prescribed warning is given by displaying an image on the image display unit 128, after which the procedure returns to step S102.

When it is determined at step S105 that no problem exists with the power unit 186, it is determined in step S107 whether a mode dial switch in the operation unit 160 is set to a shooting mode. If the mode dial switch is set to the shooting mode, the procedure transitions to step S109, and if the mode dial switch is set to another mode, the procedure transitions to step S108. In step S108, processing corresponding to the selected mode is executed, and the procedure returns to of step S102 after execution.

In step S109, determination of whether a recording medium 1200 is mounted, acquisition of management information of image data recorded on the recording medium 1200, and determination of the operational status of the recording medium 1200, namely, whether there is a problem with recording/playback of image data in relation to the recording medium 1200, are performed. If it is determined that a problem exists, the procedure proceeds to step S106, and the abovementioned warning process is performed, and if it is determined that no problem exists, the procedure transitions to step S113. At step S113, the state of various settings is displayed with images using the image display unit 128.

Next, the procedure proceeds to step S114 in FIG. 5, where it is determined whether SW1 is turned ON, by operation (for example, half-press) of the shutter switch (not shown) included in the operation unit 160. If SW1 is not ON, the procedure returns to step S102, and if SW1 is ON, the procedure transitions to step S115.

In step S115, the brightness of the object is detected, and a known photometry process for deciding the aperture and shutter speed for shooting is performed, using the photometry control unit 146. In step S116, a focusing process is performed that involves performing a focusing operation for focusing the lens 110 on the object. Here, two images (A image and B image) that pass through different pupil regions are derived by adding the pixel output vertically (or horizontally), as described with reference to FIG. 2C. Known focusing control is then performed based on the phase difference between the derived A image and B image. Note that when performing this focusing process, defective pixel information is read out from the nonvolatile memory 156, and output from the unit cell containing the defective pixel is excluded.

At step S118, it is determined whether SW2 is turned on ON, by operation (for example, full-press) of the shutter switch (not shown) included in the operation unit 160. If SW2 is not ON, the procedure transitions to step S114, and if SW2 is ON, the procedure transitions to step S119.

At step S119, it is determined whether the memory 130 has an image storage buffer area available for storing captured image data. If it is determined that there is not space available for storing new image data in the image storage buffer area of the memory 130, the procedure proceeds to step S120, where a prescribed warning is issued by the image display unit 128, after which the procedure returns to step S102. On the other hand, if it is determined that there is space available for storing new image data, the procedure transitions to step S121.

At step S121, as well as starting power supply to the image sensor 114 and sending a prescribed control signal, an image shooting operation that involves opening the shutter 112 for a prescribed amount of time and exposing the image sensor 114 to light is performed. At step S121, a readout operation is also performed, and stored electrical signals are transferred to the downstream output signal processing circuit 115. Note that in the readout operation of step S121, reading out is performed independently from each pixel of the unit cells.

Next, in step S123, the system control circuit 150 corrects the electrical signals (image signals) transferred from the image sensor 114, using the output signal processing circuit 115 (AFE 116, DFE 117) and the image processing circuit 120. Specifically, processing such as an OB clamping operation for stabilizing an OB level serving as a reference level for when viewing as an image, and shading correction for correcting small output shifts that arise depending on the position of the pixels (unit cells) in the image sensor 114 is performed.

Further, in step S124, outputs from defective pixels that cannot output normal signals are corrected, and corrected image signals are stored in a prescribed area of the memory 130. In the present embodiment, it is determined whether a pixel should be corrected, using defective pixel information (coordinates, etc.) stored in the nonvolatile memory 156 in advance. Note that the defective pixel determination is not limited to this method, and may be performed by another method, such as detecting abnormal pixel signals by image analysis. The defective pixel correction process performed at step S124 will be discussed in detail later with reference to FIG. 6.

In step S125, the system control circuit 150 reads out the image signal corrected in step S124 via the memory control circuit 122, and performs a WB (White Balance) integration operation and an OB (Optical Black) integration operation that are required in order to perform development processing. The operation' result is then stored in the memory 152 of the system control circuit 150. Next, the image processing circuit 120 is used to perform various development processing, including AWB (Auto White Balance) processing, gamma conversion and color conversion, on image signals corrected at step S124 and stored in a prescribed area of the memory 130, using the operation result stored in the memory 152.

In step S126, the control circuit system 150 compresses the developed image data, and performs a recording process for writing the read image data to a recording medium 1200 such as a Compact Flash (registered trademark) card at step S127. Whenever image data that has been captured and undergone this series of processes is newly written to an available image space in the image storage buffer area of the memory 130, this recording process is executed on that image data.

At step S128, the system control circuit 150 determines whether SW1 of the shutter switch is ON. If SW1 is OFF, the procedure returns to step S102, and if SW1 is in an ON state, the procedure returns to step S118, and prepares for the next image shooting.

Defective Pixel Correction

Figure 6:
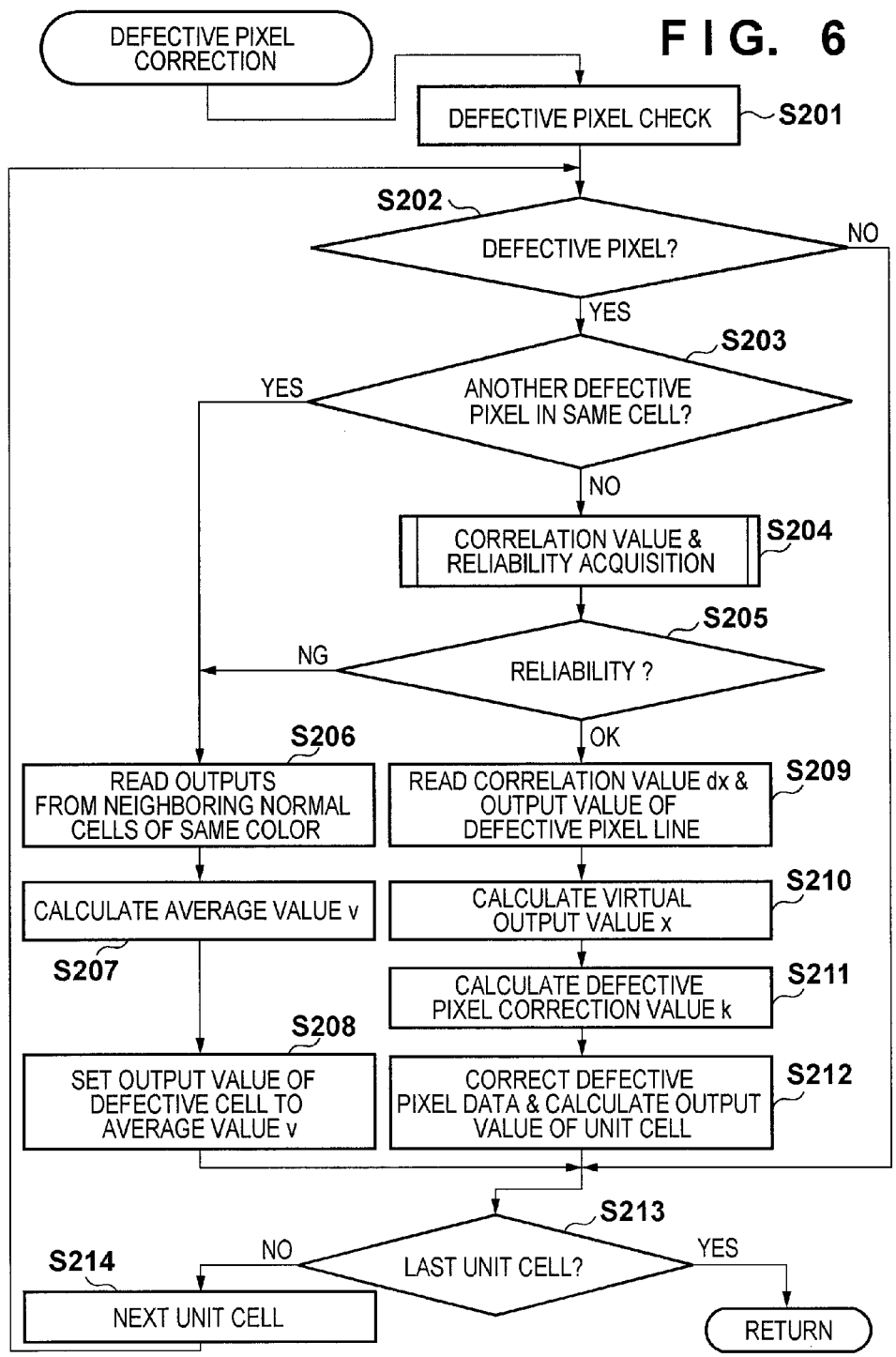
FIG. 6 is a flowchart showing a defective pixel correction operation according to the embodiment.

Next, the defective pixel correction operation performed at step S124 of FIG. 5 will be described using FIGS. 6 to 9. FIG. 6 is a flowchart showing the defective pixel correction operation according to the present embodiment.

At step S201, the coordinates and defect level of pixels that should undergo defect processing are checked, from defective pixel information stored in the nonvolatile memory 156 in advance and read out to the memory 152 in the system control circuit 150. At step S202, it is determined whether a pixel targeted for correction as a defective pixel is included in the unit cell. If a defective pixel is included, the procedure transitions to step S203, and if a defective pixel is not included (if the unit cell consists only of normal pixels), the procedure transitions to step S213.

At step S203, it is determined whether there is another defective pixel in the same unit cell that was determined to include a defective pixel. If there is another defective pixel, the procedure transitions to step S206, and if there is not another defective pixel, the procedure transitions to step S204. At step S204, a correlation value (phase difference) and a reliability of the correlation value are derived.

Acquisition of Correlation Value and Reliability

Figure 7:
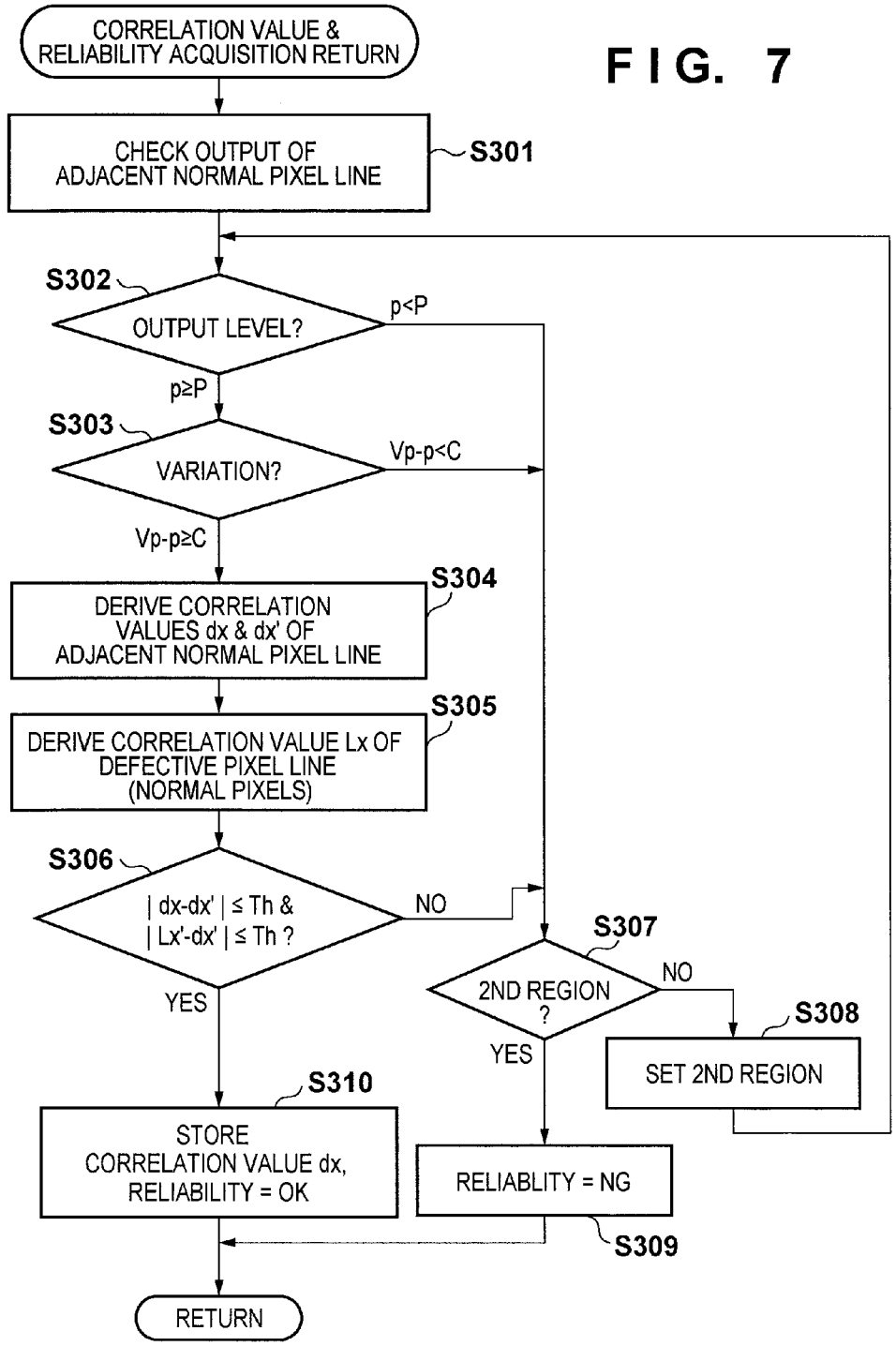
FIG. 7 is a flowchart showing an operation for acquiring a correlation value and a reliability thereof according to the embodiment.

Here, the operation performed at step S204 will be described with reference to FIG. 7. At step S301, the output values of the line having the defective pixel (referred to as "defective pixel line", hereinafter) and an adjacent normal line with the same color structure are read out. In step S302, an average value p of the output values of the defective pixel line and the adjacent normal line with the same color structure that were read out at step S301 is compared with a prescribed output level P. If p<P, the procedure transitions to step S307 because the output values are too low to enable correlation values to be derived with sufficient accuracy, and if p≥P, the procedure transitions to step S303 since the output values are sufficiently high to derive correlation values.

At step S303, a variation Vp–p in the output values of the defective pixel line and the adjacent normal line with the same color structure that were read out at step S301 is compared with a prescribed level C. If Vp–p<C, the procedure transitions to step S307 because the variation (=contrast) is too low to enable correlation values to be derived with sufficient accuracy, and if Vp–p≥C, the procedure transitions to step S304, since there is sufficient variation (=contrast) to derive correlation values.

Figure 8A:
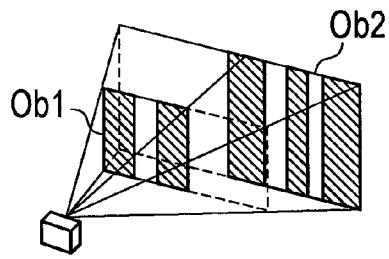
FIGS. 8A-8E are diagrams illustrating the operation for acquiring a correlation value and a reliability thereof according to the embodiment.
Figure 8B:
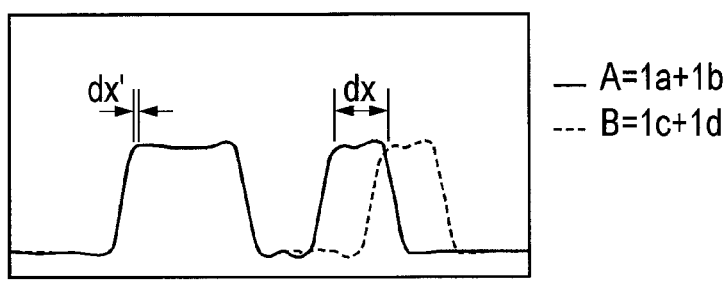
Figure 8C:
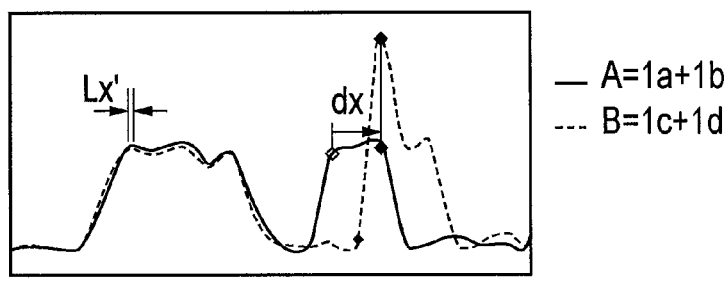

At step S304, a correlation value (phase difference) dx of a prescribed region near the defective pixel and a correlation value dx' of another prescribed region in the adjacent normal line are derived. Examples of the correlation values derived here are shown in FIGS. 8A to 8E. FIG. 8A shows output values obtained in the case where an object Ob1 and an object Ob2 are at different distances. FIG. 8B shows a portion of the output values of the adjacent normal line including the object Ob1 and the object Ob2, and FIG. 8C shows a portion of the output values obtained from the same region as FIG. 8B in the defective pixel line.

Next, in step S305, a correlation value Lx' of a prescribed region in the defective pixel line that corresponds to the region for which the correlation value dx' was derived and that includes only normal pixels is derived.

At step S306, the correlation values dx and dx' and the correlation values Lx' and dx' derived at step S304 and step S305 are compared, and it is determined whether the respective differences are within a prescribed range. Specifically, it is determined whether |dx−dx'|≤Th (threshold) and |Lx'−dx'|≤Th. If the differences are outside the prescribed range, the procedure transitions to step S307, assuming that there is an extreme change in the outputs of the defective pixel line and the adjacent normal line (i.e., change in the objects, no correlation due to the influence of noise/defects, etc.). On the other hand, if the differences are within the prescribed range, the procedure transitions to step S310, assuming that there is not an extreme change in the outputs of the defective pixel line and the adjacent normal line (i.e., there is correlation), and the correlation value dx is taken as a correlation value near the defective pixel and stored as having a high reliability (=OK).

At step S307, it is determined whether the pixel regions for which the correlation values were derived at step S304 and step S305 is an initial region (first region) or a second region that differs from the first region. If not a second region, the procedure transitions to step S308, where a second region that differs from the first region is set, after which the procedure returns to step S302 and correlation values and the reliability thereof are derived again.

Figure 8D:
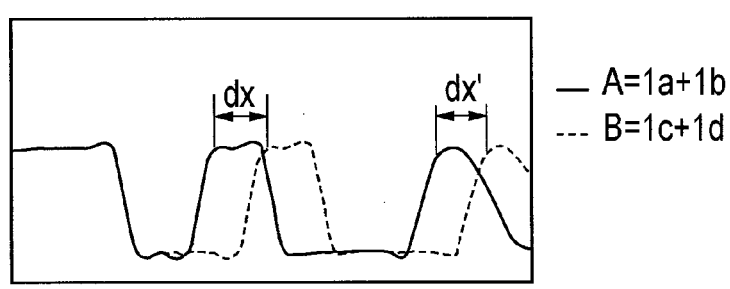
Figure 8E:
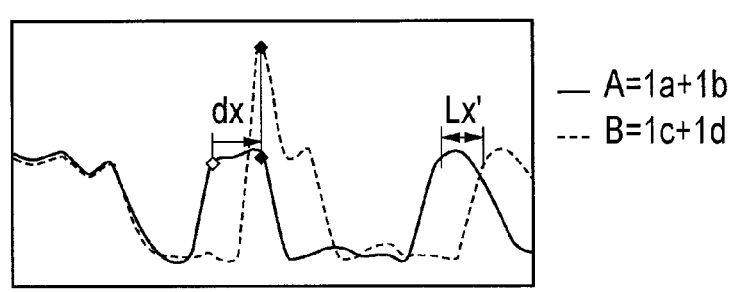

FIGS. 8D and 8E show an example in the case where the region is changed, with FIG. 8D showing a portion of the output values of the adjacent normal line including only the object Ob2, and FIG. 8E showing a portion of the output values obtained from the same region as FIG. 8D in the defective pixel line. In the examples shown in FIGS. 8D and 8E, because dx≈dx' and Lx'≈dx', and the reliability of the derived correlation values is high, the correlation value dx of the region near the defective pixel in the adjacent normal line is stored in step S310 the second time around.

On the other hand, the procedure transitions to step S309 when it is determined at step S307 that a second region is set, and the correlation values derived at steps S304 and S305 are stored as having a low reliability (=NG).

Note that the region for acquiring correlation values set in steps S307 and S308 is primarily intended to avoid a correlation mismatch that arises because of object dependency. Thus, cases are also envisioned where, for example, a change in objects at the boundary between a defective pixel line and the normal pixel line above that line results in a lack of correlation therewith but similarity with objects in the normal pixel line below the defective pixel line or where objects on the left and right of the region for acquiring correlation values are different in a line containing a defective pixel and the normal pixel line above that line but are similar when the region being observed is narrowed laterally. Accordingly, while the present embodiment is kept to switching from a first region to a second region, additionally performing the determination for a plurality of regions also conforms to the spirit of the present invention. For example, while processing that moves the region horizontally is performed in FIGS. 8A to 8E, processing that narrows the region, widens the region, or changes the position of the region in the vertical direction also conforms to the spirit of the present invention.

After the above processing has ended, the procedure proceeds to step S205 of FIG. 6. In step S205, the result of the reliability of the correlation value checked at step S204 is determined. If the reliability is low (=NG), the procedure transitions to step S206, and if the reliability is high (=OK), the procedure transitions to step S209.

The procedure transitions to step S206 in the case where there is another defective pixel in the same cell or where the reliability of the correlation values is low. The output values ($1a+1b+1c+1d$) of neighboring normal unit cells of the same color that do not contain a defective pixel are thus read out, and in step S207, an average value v of the output values of the neighboring unit cells of the same color read out at step S206 is calculated. Next in step S208, the output value of the unit cell containing the one or more defective pixels is corrected by being replaced by the average value v derived at step S207, and stored in the memory 130, after which the procedure proceeds to step S213.

Note that the method of calculating the correction value at steps S206 and S207 is assumed to involve the correction value being set to the average value of the output values ($1a+1b+1c+1d$) of unit cells of the same color on the left, right, above and below, for example, but the present invention is not limited thereto. Correction may be performed with another correction method, provided that the correction value of a defective pixel is not calculated using correlation values. For example, an average value of the output values of the pixels $1d$ in unit cells of the same color on the left, right, above and below may be derived for a defective pixel $1d$.

Figure 9:
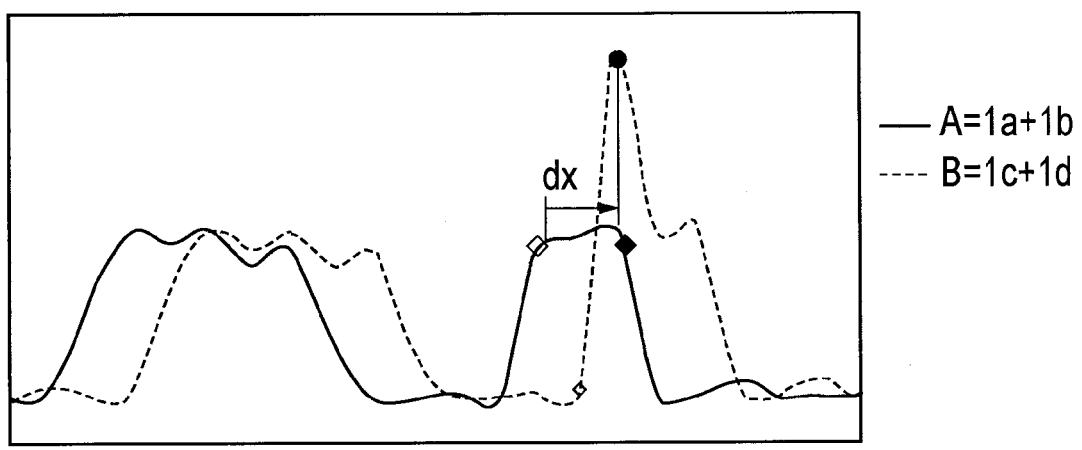
FIG. 9 is a diagram illustrating how a defective pixel is corrected according to the embodiment.

On the other hand, if it is determined at step S205 that the reliability of correlation is high (=OK), the output values (a portion or all) of the A and B images of the line containing the defective pixel are read out in step S209. Then, in step S210, a virtual output value x of the defective pixel is derived from the correlation value dx stored at step S204 and the output values of the A image and/or the B image including the defective pixel. FIG. 9 is a diagram showing an example of an A image and a B image read out at step S209. Note that, here, it is assumed that the pixel $1d$ is a defective pixel, and the A and B images are horizontally shifted, as described with reference to FIGS. 3A to 3C.

In FIG. 9, "●" indicates the value ($1c+1d$) of the B image that includes the output from the defective pixel $1d$. Here, since the A and B images are displaced by the correlation value dx, the value of the A image output from a unit cell that is displaced by the correlation value dx (phase difference) will correspond to the value of the B image output from the unit cell containing the defective pixel $1d$. Accordingly, in step S210, the value of the A image output from the unit cell that is in a position displaced by the correlation value dx, shown by "◇" in FIG. 9, is read out, and taken as the virtual output value x. Then, in step S211, a value obtained by subtracting the output value of the normal pixel out of the pixels $1c$ and $1d$ (here, pixel $1c$) constituting the B image from this virtual output value x is calculated as a defective pixel correction value k. For example, if the pixel $1d$ is defective, the correction value of the defective pixel $1d$ is calculated as:

Defective pixel correction value k=Virtual output value x−Output value of pixel $1c$.

At step S212, the output value of the unit cell containing the defective pixel $1d$ is corrected using the defective pixel correction value k derived at step S211 ("◆" in FIG. 9). Note that while the correction value for the defective pixel $1d$ was derived in the abovementioned processing, the value ($1c+1d$) of the B image that includes the defective pixel $1d$ may be replaced by the virtual output value x. The output value ($1a+$ $1b+1c+k$) of the unit cell is then calculated using the corrected output value k of the defective pixel $1d$, and stored in the memory 130.

At step S213, it is determined whether the defect correction operation has been performed up to the last unit cell of the image. If the defect correction operation has not been performed up to the last unit cell, the procedure transitions to step S214, where the unit cell to be checked is moved to the next unit cell (for example, a unit cell checking counter is incremented by 1), and the abovementioned processing is performed after returning to step S202, which has already been described. If, it is determined at step S213 that the processed unit cell is the last one, the procedure returns to the processing of FIG. 5.

According to the present embodiment as described above, an image capturing apparatus using an image sensor in which unit cells are constituted by a plurality of pixels is capable of performing appropriate defect correction in the case where any of the pixels in a unit cell is defective, regardless of the focus state of an object image formed near the defective pixel.

Also, performing correction with low reliability can be avoided, in the case where the reliability of the correlation values of normal pixels used in correction is low (i.e., low luminance/contrast, correlation mismatch due to object dependency, change in output due to noise/defect, etc.).

Also, correction in the present embodiment is described as being performed with reference to correlation values in lines adjacent in the column direction, where the A image=$1a+1b$ and the B image=$1c+1d$. However, the present invention is not limited thereto, and correction in the present invention is also intended to be performed with reference to the correlation values of lines adjacent in the row direction, where the A image=$1a+1c$ and the B image=$1b+1d$.

Further, although a group of different cells in adjacent lines is designated as a group of normal pixel cells of the same color structure for deriving the correlation values of the present invention, the present invention is not limited thereto, and correlation values may be acquired with normal pixels from which correlation values can be acquired within the same unit cell and used in correction, for example. Specifically, a correlation value for a defective pixel $1d$ may be derived with the images of normal pixels $1a$ and $1c$, and correction may be performed with the value of a normal pixel $1b$ that is in a position displaced by the correlation value.

Note that while the present invention is described in the abovementioned embodiment as being specialized for correction of image output, the present invention may be utilized for applications other than correction of image output, such as, for example, recording the correction value of a defective pixel in image information as distance information of pixel units, based on correlation values in the present invention.

Also, the present invention, although described in the abovementioned embodiment as having a configuration in which a unit cell includes four pixels, is not limited thereto. Even with a configuration in which nine pixels of the same size are arranged within a unit cell, or a configuration that includes unit cells each constituting a plurality of pixels (for example, four pixels) of the same size provided for use in focusing and unit cells each constituting pixel/pixels of a different size (for example, one pixel), the present invention is useful as a defect correction method.

Further, although an example was given in the abovementioned embodiment in which composite pixels having four pixels in a unit cell are arranged over the entire surface of the image sensor, the present invention is not limited thereto. For example, even with a configuration in which composite pixels are arranged discretely every few lines and/or rows, effective correction can be performed depending on the state of the arrangement.

Also, in the case where the output values of pixels $1a$ to $1d$ are synthesized per unit cell, the timing of the synthesizing is not limited to the abovementioned timing, and the output values may be synthesized at any timing, provided that, when correcting a defective pixel, correction can be performed utilizing the phase difference between images.

Other Embodiments

In the abovementioned embodiment, the case where correction of an output from a defective pixel is performed in an image capturing apparatus was described, although by providing image signals obtained from the image sensor 114 and defective pixel information, correction can be performed in an image processing apparatus such as a computer, for example.

Aspects of the present invention can also be realized by a computer of a system or apparatus (or devices such as a CPU or MPU) that reads out and executes a program recorded on a memory apparatus to perform the functions of the above-described embodiment(s), and by a method, the steps of which are performed by a computer of a system or apparatus by, for example, reading out and executing a program recorded on a memory apparatus to perform the functions of the above-described embodiment(s). For this purpose, the program is provided to the computer for example via a network or from a recording medium of various types serving as the memory apparatus (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2010-251277, filed on Nov. 9, 2010, which is hereby incorporated by reference herein in its entirety.

What is claimed is:

1. An image processing apparatus having an image sensor having a plurality of unit cells that each includes a plurality of photoelectric conversion elements each of which outputs an image signal, and the plurality of photoelectric conversion elements have a function of obtaining a first output signal using the image signals of a plurality of first photoelectric conversion elements and a second output signal using the image signals of a plurality of second photoelectric conversion elements for generating a pair of first image and second image to be used for focus detection, comprising:

a detection unit that detects a phase difference between the first image generated using the first outputs of the plurality of unit cells and the second image generated using the second outputs of the plurality of unit cells;

a determination unit that determines whether any of the plurality of photoelectric conversion elements is defective; and a correction unit that, if a photoelectric conversion element that is determined to be defective by the determination unit is one of the second photoelectric conversion elements, corrects the second output of a unit cell including the second photoelectric conversion element that is determined to be defective using the first output of a unit cell located at a position shifted by the phase difference from the unit cell including the second photoelectric conversion element that is determined to be defective.

2. The image processing apparatus according to claim 1, wherein the detection unit detects a horizontal phase difference between the first and second images formed by the first and second outputs that are obtained using image signals of photoelectric conversion elements, among the plurality of the photoelectric conversion elements, included in respective regions obtained by dividing the unit cells vertically into two.

3. The image processing apparatus according to claim 1, wherein the detection unit detects a vertical phase difference between the first and second images formed by the first and second outputs that are obtained using image signals of photoelectric conversion elements, among the plurality of the photoelectric conversion elements, included in respective regions obtained by dividing the unit cells horizontally into two.

4. The image processing apparatus according to claim 1, further comprising a synthesizing unit that synthesizes, for each unit cell, image signals of all the photoelectric conversion elements included in the unit cell, wherein the synthesizing unit uses the second output signal corrected by the correction unit in place of the image signals of the plurality of second photoelectric conversion elements that are output from a unit cell including the second photoelectric conversion element that is determined to be defective.

5. The image processing apparatus according to claim 1, further comprising a reliability determination unit that determines whether a reliability of the phase difference detected by the detection unit is higher than a predetermined reliability,
wherein if it is determined by the reliability determination unit that the reliability is not higher than the predetermined reliability, the correction unit corrects the second output signal of the unit cell including the second photoelectric conversion element that is determined to be defective, using the first output signal of a a unit cell neighboring the unit cell that includes the second photoelectric conversion element that is determined to be defective.

6. An image capturing apparatus comprising:
the image sensor; and
the image processing apparatus according to claim 1.

7. The image capturing apparatus according to claim 6, wherein the unit cells are arranged over an entire surface of the image sensor.

8. The image capturing apparatus according to claim 6, wherein the unit cells are arranged discretely.

9. An image processing method for an image processing apparatus having an image sensor having a plurality of unit cells that each includes a plurality of photoelectric conversion elements each of which outputs an image signal, and the plurality of photoelectric conversion elements have a function of obtaining a first output signal using the image signals of a plurality of first photoelectric conversion elements and a second output signal using the image signals of a plurality of second photoelectric conversion elements for generating a pair of first image and second image to be used for focus detection, comprising:
  a detection step of detecting a phase difference between the first image generated using the first outputs of the plurality of unit cells and the second image generated using the second outputs of the plurality of unit cells;
  a determination step of determining whether any of the plurality of photoelectric conversion elements is defective; and
  a correction step of, if a photoelectric conversion element that is determined to be defective in the determination step is one of the second photoelectric conversion elements, correcting the second output of a unit cell including the second photoelectric conversion element that is determined to be defective using the first output of the unit cell located at a position shifted by the phase difference from the unit cell including the second photoelectric conversion element that is determined to be defective.

10. A non-transitory readable storage medium having stored thereon a program which is executable by an image processing apparatus, the program having a program code for realizing the image processing method according to claim 9.

* * * * *